Jan. 2, 1940.   W. KNAPP   2,185,304
RECIPROCATORY CARRIAGE STRUCTURE
Filed Dec. 24, 1937   3 Sheets-Sheet 1

INVENTOR.
Walter Knapp
Ramsey, Kent, Chisholm & Lutz
his ATTORNEYS

INVENTOR.
Walter Knapp
BY Ramsey, Kent, Chisholm & Lutz
his ATTORNEYS

Jan. 2, 1940.  W. KNAPP  2,185,304

RECIPROCATORY CARRIAGE STRUCTURE

Filed Dec. 24, 1937   3 Sheets-Sheet 3

INVENTOR.
Walter Knapp
BY Ramsey, Kent, Chisholm & Lutz
his ATTORNEYS

Patented Jan. 2, 1940

2,185,304

UNITED STATES PATENT OFFICE 2,185,304

RECIPROCATORY CARRIAGE STRUCTURE

Walter Knapp, Manheim Township, Lancaster, County, Pa., assignor to De Walt Products Corporation, Lancaster, Pa., a corporation of Pennsylvania Application December 24, 1937, Serial No. 181,633

5 Claims. (Cl. 308—6)

This invention relates to cutting machinery of the type in which a carriage carrying a cutter is moved with respect to the work. The particular machine disclosed is primarily intended for woodworking, but the invention is applicable to machines for working other materials, e. g., metal, stone, and synthetic products.

The principal object of the invention is to provide improved means for mounting the carriage on an arm for reciprocation thereon. Supports of the opposed-V sliding type, such as are commonly used for lathe slide rests, offer considerable resistance to sliding movement.

According to the present invention anti-friction rollers are used, arranged so that even taking into consideration normal wear and the liability of the cooperating parts to twist or be distorted under pressure the carriage cannot rock appreciably angularly with respect to the longitudinal axis of the arm. To accomplish this result, each side of the carriage is provided with a set of rollers, one roller or pair of rollers being arranged to turn about a horizontal axis or axes and to run on an overhead track on the arm, while another roller or pair of rollers is arranged to turn about an axis or axes obliquely arranged with respect to the horizontal. The sets of rollers above set forth provide what may be termed a four-point suspension, which is more effective in preventing angular movement of the carriage with respect to the axis of the arm than a three-point suspension.

The rollers are also arranged so that the carriage cannot rock appreciably in a horizontal plane or in a vertical plane with respect to the supporting arm. To secure this result each side of the carriage is provided with two horizontally and two obliquely mounted rollers spaced a considerable distance apart to minimize rocking of the carriage in any direction. However, with four horizontal rollers running on two parallel spaced tracks and four oblique rollers running on two parallel, although inclined, tracks, it is important to be able to adjust the rollers so that all eight rollers contact their respective tracks simultaneously.

Further features of the invention will be explained in connection with the description of various forms of the invention shown, by way of example, in the accompanying drawings, wherein.

Figure 1:
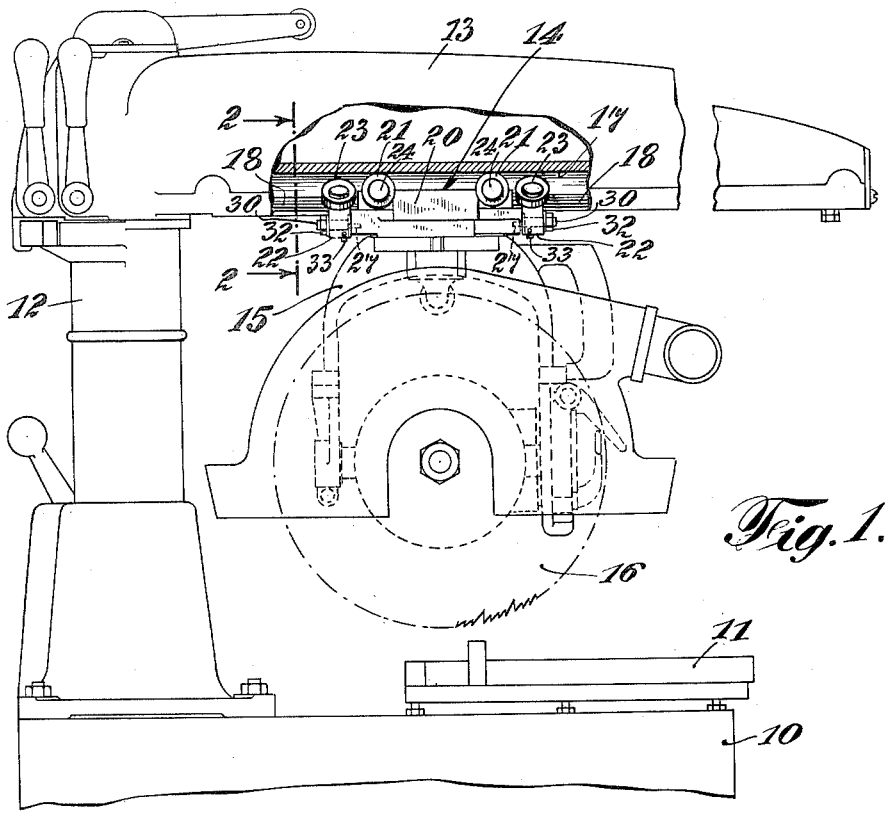
Fig. 1 is a side elevation of a machine embodying the present improvements.
Figure 2:
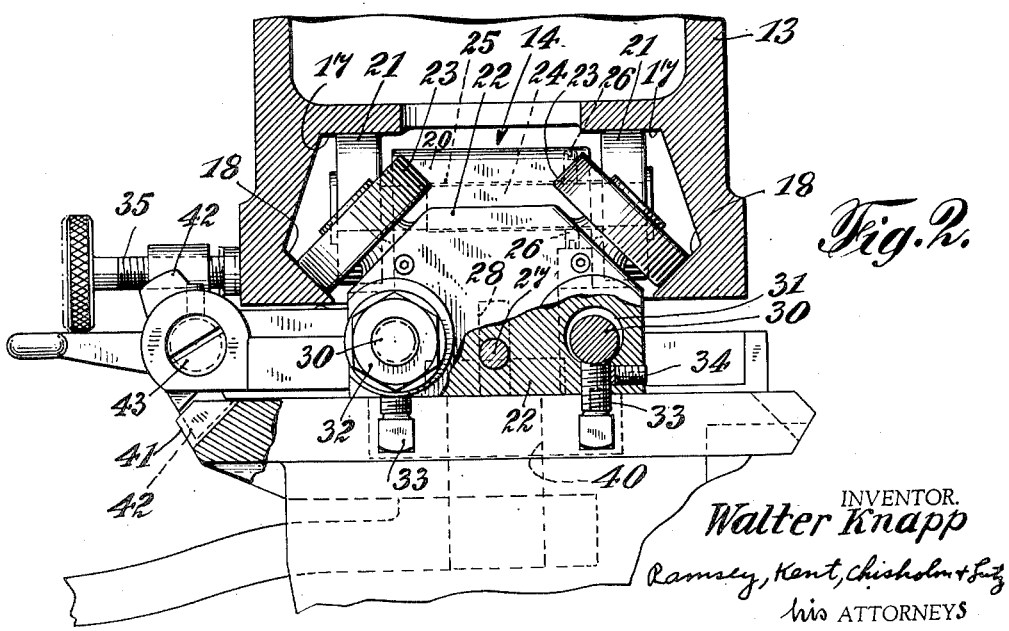
Fig. 2 is a detail section taken in general on the line 2—2 of Fig. 1.

The machine shown in Figs. 1 and 2 comprises a base 10 carying a work-holding table 11, a column 12 and an arm 13 projecting horizontally over the table 11. This arm supports a carriage designated as a whole by 14, to the bottom of which is secured a frame 15, carrying a motor (not shown) for driving a saw 16 or other rotary cutter. On the interior of arm 13 are carriage roller tracks 17 and 18.

The carriage (see also Figs. 3, 4, and 5) comprises a body 20 supporting two pairs of rollers 21 arranged to rotate about horizontal axes and run on tracks 17. In Figs. 1 and 2 there are two yokes 22 adjustably secured to the ends of the body, each carrying a pair of rollers 23, arranged to rotate about axes obliquely arranged with respect to the horizontal and run on tracks 18.

The above-mentioned four-point suspension could be obtained without serious loss in stability in a horizontal or vertical plane with respect to the supporting arm by using only one pair of rollers 21 centrally arranged between two pairs of rollers 23. Similarly, one oblique roller 23 on one side of the carriage midway between the two pairs of rollers 21 and two oblique rollers 23 on the other side of the carriage adjacent its ends could be used. The eight-roller construction shown is, however, more satisfactory than these and other possible alternatives.

The rollers 21 are rotatably mounted on shafts 24. One shaft 24 is fixedly positioned in body 20 as usual; but the other shaft 24 passes through a transverse hole 25, which substantially fits the shaft at one end only. The middle and other end of hole 25 is of larger diameter than the shaft (see Fig. 5) so that, by adjusting a pair of set-screws 26 the corresponding end of the shaft may be raised or lowered slightly to bring all four rollers 21 into contact simultaneously with their respective tracks 17.

The oblique rollers are not adjustable with respect to their supporting yokes 22, but the yokes are made adjustable both vertically and angularly with respect to the body 20. In the form of construction shown in Figs. 1 and 2, a circular projection 27 is provided on each yoke extending into a vertical channel 28 in the end of the body, so that the yokes can move vertically or angularly with respect to the body, but not laterally. To provide adjusting and clamping means for the yokes, two threaded studs 30 project from each end of the body (see Fig. 2) and pass through oversize holes 31 in the yokes for engagement with clamping nuts 32. Adjusting screws 33 bear against the undersides of these studs and by screwing them upwardly the yokes can be drawn down to bring the rollers 23 into proper rolling relation with respect to their tracks 18. These adjusting screws can be clamped in adjusted position by set screws 34. After both yokes have been adjusted the clamping nuts 32 are tightened.

Figure 3:
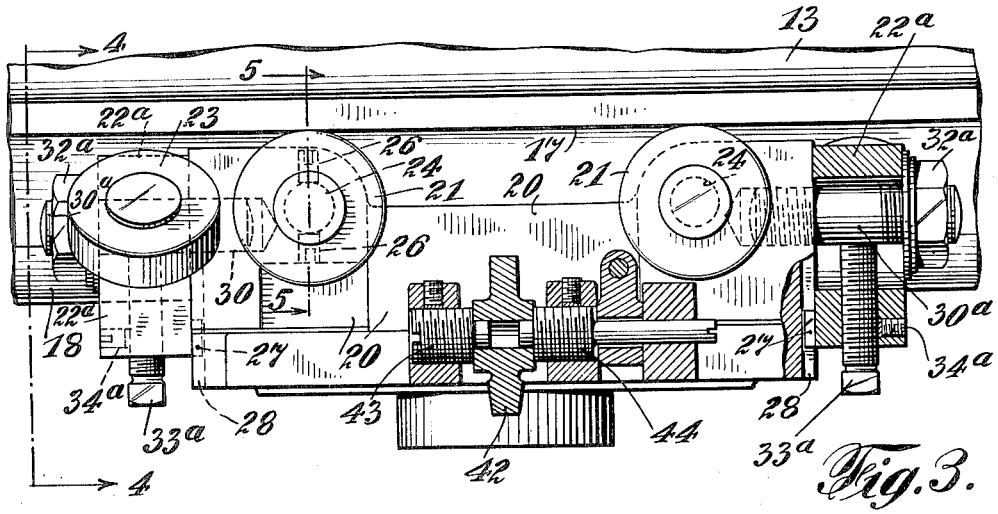
Fig. 3 is a side elevation of the carriage on an enlarged scale, with parts in section. In this figure the general carriage structure is the same as shown in Figs. 1 and 2, but certain modifications as to detail are shown.
Figure 4:
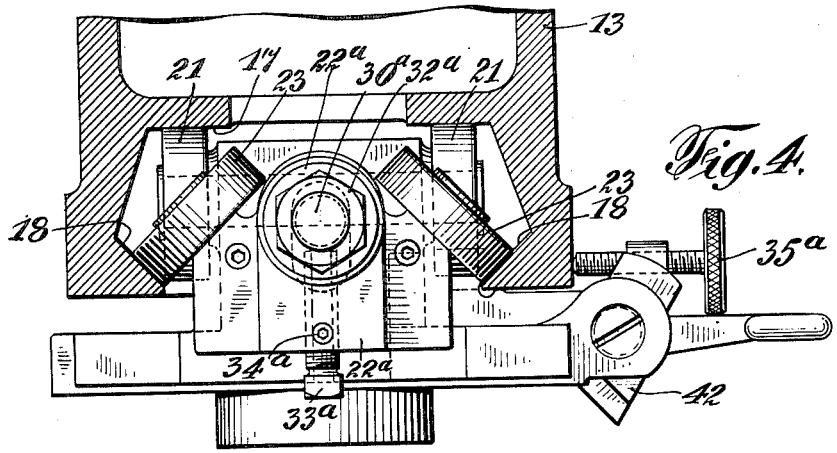
Fig. 4 is a section on the line 4—4 of Fig. 3.
Figure 5:
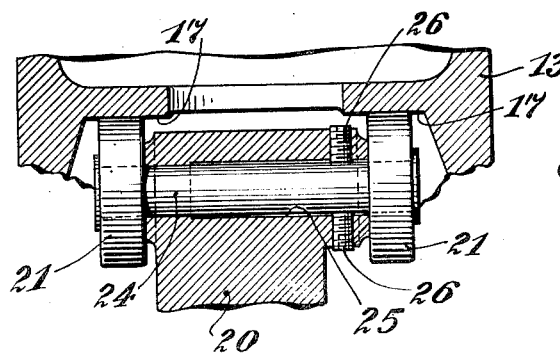
Fig. 5 is a detail section on the line 5—5 of Fig. 3.

The construction shown in Figs. 3 and 4 differs from that of Figs. 1 and 2 in that the yokes 22a, which carry the inclined rollers 23, are pierced by a single stud 30a and adjusted relatively thereto by a single screw 33a, held in adjusted position by a set screw 34a. As before, each of the yokes is clamped against an end of the body by tightening a nut 32a.

Figure 6:
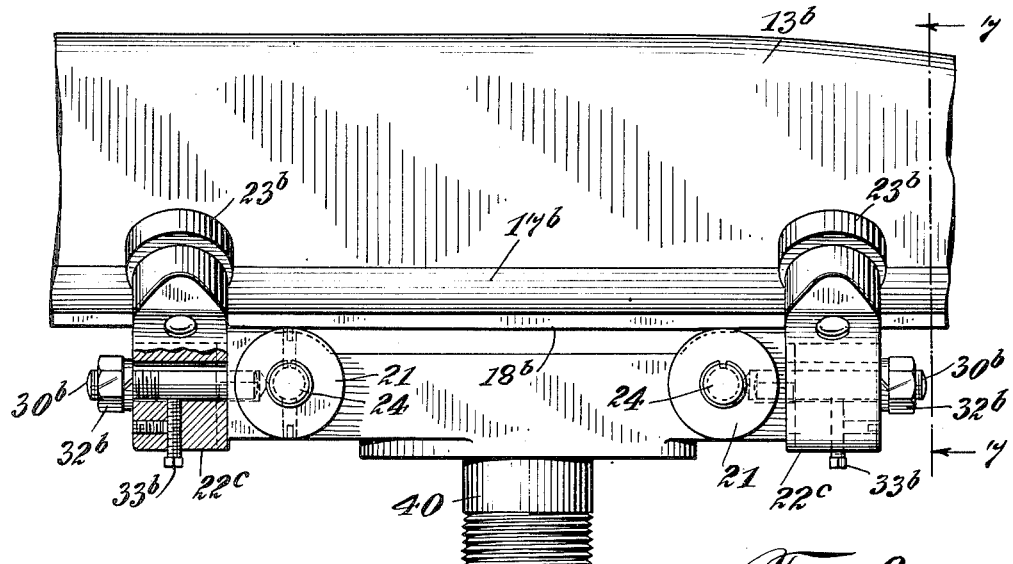
Fig. 6 is a side elevation of a modified form of arm and carriage.
Figure 7:
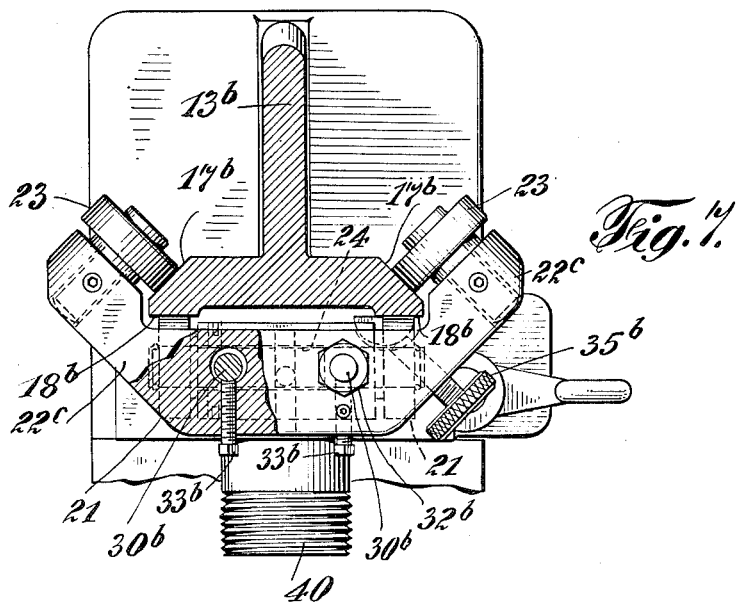
Fig. 7 is a section taken in general on the line 7—7 of Fig. 6.

In the construction shown in Figs. 6 and 7, the arm 13b which carries the carriage is of inverted T-section instead of being hollow. The lower part of the arm is provided with roller tracks 17b and 18b, which although reversed as to relative positions function in precisely the same way as the tracks 17 and 18 of the previously described forms of construction.

The yokes 22c which carry the oblique rollers are adjusted and clamped by pairs of bolts 30b, screws 33b and nuts 32b, in the manner described in connection with Fig. 2.

While the carriage is normally free to move along the arm, it may be clamped in any desired position therealong by tightening screws 35 (Fig. 2), 35a (Fig. 4) or 35b (Fig. 7).

The frame 15 on which the saw 16 and its motor are mounted is rotatably secured to the under side of the carriage by a king-pin 40. For the purpose of locking the frame 15 and thereby the cutter 16 in any desired angular position with respect to the axis of the supporting arm, the upper part of the frame has a series of bevelled notches 41 cut therein (Fig. 2) while the carriage has a pivotally mounted latch 42 adapted to enter any selected notch. To enable adjustments less than the distance between adjacent notches 41 to be made the latch 42 is pivotally mounted on the ends of two screws 43 and 44 (Fig. 3). By loosening one screw and tightening the other, the latch may be moved laterally and thereby adjust the angular position of the frame 15.

It will be seen that the construction disclosed provides for accurate straight line reciprocation, without undue friction. Also the construction is one which provides for accurate initial adjustment, is one into which little lost motion is introduced by ordinary wear, and is one which can readily be readjusted to compensate for wear.

In compliance with the patent statutes I have disclosed the best forms in which I have contemplated applying my invention, but the disclosure is, of course, illustrative only and not limiting.

What is claimed is:

1. In a cutting machine, a reciprocatory carriage organization comprising: means providing a first pair of spaced tracks and a second pair of spaced tracks angularly positioned with respect to the first pair of tracks, the tracks being horizontal and being stationary during the operation of the machine, a carriage movable along the tracks, a first set of four rollers mounted on the carriage for engagement with the first pair of tracks, means to shift the axis of at least one of said rollers to bring them all into accurate engagement with their tracks, a second set of four rollers mounted on the carriage for engagement with the second pair of tracks, means to shift the axis of at least one of the rollers of said second set of four to bring all of the rollers of the second set into accurate engagement with their tracks, and a cutting tool suspended from said carriage.

2. In a cutting machine of the type in which there is a work-supporting base, a column extending upwardly from said base, a non-reciprocating horizontal arm supported by said column and projecting over said base, a reciprocating tool carriage mounted on said arm, and a cutting tool suspended from said carriage; the improvement which comprises: the arm having two pairs of spaced tracks extending lengthwise of the arm, the tracks of one pair being horizontal and the tracks of the other pair being inclined in opposite directions with respect to a vertical plane extending axially of the arm, and the carriage being provided with eight rollers arranged in two groups spaced lengthwise of said arm, each group having a pair of rollers mounted on inclined axes and engaging the respective inclined tracks from above whereby the inclined tracks support the weight of the carriage and cutting tool, and each group also having a pair of rollers mounted on horizontal axes and engaging the respective horizontal tracks from below.

3. In a cutting machine of the type in which there is a work-supporting base, a column extending upwardly from said base, a non-reciprocating horizontal arm supported by said column and projecting over said base, a reciprocating tool carriage mounted on said arm, and a cutting tool suspended from said carriage; the improvement which comprises: two pairs of spaced tracks on said arm and extending lengthwise thereof, the tracks of one pair being horizontal and the tracks of the other pair being inclined in opposite directions with respect to a vertical plane extending axially of the arm, eight rollers associated with the carriage and arranged in two groups spaced lengthwise thereof, each group having a pair of vertical rollers engaging the respective horizontal tracks and a pair of inclined rollers engaging the respective inclined tracks, the inclined rollers supporting the weight of the carriage and cutting tool, horziontal shafts on the carriage and on which the vertical rollers are mounted, means to adjust the end of one horizontal shaft to thereby bring all of the four vertical rollers into accurate engagement with the horizontal tracks, and means to adjust the axial position of each of the inclined rollers relative to the carriage and thereby bring all four of the inclined rollers into accurate engagement with the inclined tracks.

4. In a cutting machine of the type in which there is a work-supporting base, a column extending upwardly from said base, a non-reciprocating horizontal arm supported by said column and projecting over said base, a reciprocating tool carriage mounted on said arm, and a cutting tool suspended from said carriage; the improvement which comprises: a pair of tracks on said arm and extending lengthwise thereof, the tracks being inclined in opposite directions with respect to a vertical plane extending axially of the arm, a yoke connected to said carriage, the yoke being adjustable relative to the carriage by both a rocking movement and a vertical movement which are independent of each other, a pair of inclined axles carried by said yoke, and rollers on said axles engaging said tracks respectively and supporting the weight of the carriage and cutting tool.

5. In a cutting machine of the type in which there is a work-supporting base, a column extending upwardly from said base, a non-reciprocating horizontal arm supported by said column and projecting over said base, a reciprocating tool carriage mounted on said arm, and a cutting tool suspended from said carriage; the improvement which comprises: a pair of tracks on said arm and extending lengthwise thereof, the tracks being inclined in opposite directions with respect to a vertical plane extending axially of the arm, yokes connected to the ends of said carriage, each yoke being adjustable relative to the carriage by both a rocking movement and a vertical movement which are independent of each other, a pair of inclined axles carried by each of said yokes, and rollers on said axles engaging said tracks respectively and supporting the weight of the carriage and cutting tool.

WALTER KNAPP.